US007455362B2

(12) United States Patent
Hanson et al.

(10) Patent No.: US 7,455,362 B2
(45) Date of Patent: Nov. 25, 2008

(54) ADJUSTABLE MOTION WHEEL CHAIR

(75) Inventors: Wayne H. Hanson, Belgrade, MT (US); Dale A. Mandeville, Belgrade, MT (US); William B. Phelps, Belgrade, MT (US); Stephen M. Sanford, Belgrade, MT (US); Edward D. Urband, Belgrade, MT (US); Gregor Horacek, Ransbach-Baumbach (DE)

(73) Assignee: Kids Up, Inc., Belgrade, MT (US)

( * ) Notice: Subject to any disclaimer, the term of this patent is extended or adjusted under 35 U.S.C. 154(b) by 147 days.

(21) Appl. No.: 11/486,407

(22) Filed: Jul. 13, 2006

(65) Prior Publication Data

US 2007/0029857 A1 Feb. 8, 2007

Related U.S. Application Data

(60) Provisional application No. 60/699,429, filed on Jul. 14, 2005.

(51) Int. Cl.
*B60N 2/02* (2006.01)
*B60N 2/48* (2006.01)

(52) U.S. Cl. .................... 297/363; 297/440.2; 297/320; 297/321; 297/322; 297/354.12; 297/368; 297/369

(58) Field of Classification Search .............. 297/440.2, 297/320, 321, 354.12, 250.1, 256.16, 363, 297/366, 372, 367, 368, 369, 340, 344.1, 297/376, 328
See application file for complete search history.

(56) References Cited

U.S. PATENT DOCUMENTS 1,075,636 A * 10/1913 Eyles ......................... 297/319

(Continued)

FOREIGN PATENT DOCUMENTS

DE 29718696 2/1998

(Continued)

OTHER PUBLICATIONS

Conner, Patrick S. "A Bit of Freedom for Full-Body Extensor Thrust—A Non-Static Positioning Approach." Jan. 23-25, 1997, DoubleTree Hotel and David L. Lawrence Convention Center, Pittsburgh, PA. *Thirteenth International Seating Symposium: Seating & Mobility for People with Disabilities*. pp. 185-187.

*Primary Examiner*—Katherine W Mitchell
*Assistant Examiner*—Jeff Tang
(74) *Attorney, Agent, or Firm*—Greenberg Traurig, LLP

(57) ABSTRACT

An adjustable motion wheel chair having a mobility base for supporting a back panel and a seat panel. A pair of control plates are mounted to the mobility base and positioned laterally across the mobility base in spaced apart parallel relation. The back panel includes a pair of pivot pins located on opposite lateral edges of the back panel which are pivotally received by a respective control plate. A linkage member hingedly connects the seat panel to the back panel. Each control plate includes a forwardly extending stop for limiting the downward movement of a front edge of the seat panel. A latch member is attached to each control plate and is operable between a first position where the back panel is fixed in angular relation with the seat panel and a second position where the back panel is rotatable with respect to the seat panel.

22 Claims, 10 Drawing Sheets

U.S. PATENT DOCUMENTS 2,616,483 A * 11/1952 Jensen .................... 297/300.6
2,745,467 A * 5/1956 Vale .................... 297/320
3,540,777 A * 11/1970 De Beaumont .......... 297/284.4
3,578,382 A * 5/1971 Servadio .................... 297/488
3,640,566 A 2/1972 Hodge
3,695,695 A * 10/1972 Colucci .................... 297/341
3,736,025 A * 5/1973 Ziegler et al. .............. 297/369
3,781,062 A * 12/1973 Farmer et al. .......... 297/378.13
3,784,252 A * 1/1974 Peterson .................... 297/364
4,039,223 A 8/1977 Kristensson
4,046,418 A * 9/1977 Smith et al. ................ 297/118
4,067,249 A 1/1978 Deucher
4,120,530 A 10/1978 Imbro
4,231,614 A 11/1980 Shaffer
4,437,703 A * 3/1984 Nishikori et al. ........... 297/362
4,544,200 A * 10/1985 Dunn et al. .............. 297/265.1
4,561,621 A * 12/1985 Hill .................... 248/397
4,865,384 A * 9/1989 Desanta .................. 297/300.4
4,957,302 A * 9/1990 Maxwell .................... 280/32.6
5,044,647 A * 9/1991 Patterson ................ 280/250.1
5,108,148 A 4/1992 Henke
5,152,543 A * 10/1992 Sims et al. .............. 280/250.1
5,181,761 A * 1/1993 Meeker ................ 297/256.13
5,201,087 A * 4/1993 Wickham et al. .............. 5/610
5,263,763 A * 11/1993 Billette .................... 296/65.17
5,294,141 A * 3/1994 Mentessi et al. ......... 280/250.1
5,320,416 A 6/1994 Kornberg
5,364,151 A * 11/1994 Yurasits .................. 296/65.09
5,480,172 A * 1/1996 James .................... 280/250.1
5,593,173 A 1/1997 Williamson
5,671,974 A * 9/1997 Boycott et al. ........... 297/440.2
5,685,612 A * 11/1997 MacDonald et al. ..... 297/378.1
5,743,594 A * 4/1998 Suskey et al. .......... 297/354.13
5,779,310 A * 7/1998 Suskey et al. .......... 297/354.13
5,785,384 A 7/1998 Sagstuen
5,865,447 A * 2/1999 Huang .................... 280/30
5,904,398 A 5/1999 Farricielli
5,975,634 A * 11/1999 Knoblock et al. ........ 297/300.4
5,997,021 A * 12/1999 Robinson et al. ......... 280/250.1
6,030,042 A * 2/2000 Bauer et al. ................ 297/341
6,032,975 A 3/2000 Hanson et al.
6,033,020 A * 3/2000 Ito .................... 297/302.4
6,050,356 A * 4/2000 Takeda et al. .............. 180/65.1
6,070,937 A * 6/2000 Ginat .................... 297/285
6,082,818 A * 7/2000 Muller .................... 297/250.1
6,086,086 A * 7/2000 Hanson et al. .............. 280/650
6,106,068 A * 8/2000 Lefevere .................... 297/367
6,129,415 A 10/2000 Galloway
6,347,833 B1 * 2/2002 Chen .................... 297/328
6,394,476 B1 * 5/2002 Molnar .................... 280/250.1
6,394,545 B2 * 5/2002 Knoblock et al. ........ 297/284.4
6,488,332 B1 * 12/2002 Markwald .................... 297/68
6,595,583 B2 * 7/2003 Hou .................... 297/130
6,644,744 B2 * 11/2003 Seibold .................... 297/335
6,652,030 B2 * 11/2003 Conner et al. ............... 297/333
6,669,288 B2 * 12/2003 Nakagawa et al. ..... 297/256.16
6,685,270 B2 * 2/2004 Haglund .................... 297/367
6,715,783 B1 * 4/2004 Hanson et al. .............. 280/642
6,742,843 B2 * 6/2004 Golynsky .................. 297/363
6,811,522 B1 * 11/2004 McQuinn .................... 482/143
6,886,843 B1 * 5/2005 Papac .................... 280/250.1
6,976,698 B2 * 12/2005 Kuiken .................... 280/647
7,007,965 B2 3/2006 Bernatsky et al.
7,036,878 B2 * 5/2006 Masutani ................ 297/216.1
7,044,498 B2 * 5/2006 Chen .................... 280/642
7,044,554 B2 * 5/2006 Furtado et al. .............. 297/376
7,070,233 B2 * 7/2006 Laffin .................... 297/183.9
7,077,416 B2 * 7/2006 Duarte .................... 280/304.1
7,090,240 B2 * 8/2006 Papac .................... 280/647
7,100,988 B1 * 9/2006 Hyslop .................... 297/376
7,204,556 B2 * 4/2007 Schwerdtner et al. .. 297/378.12
7,222,921 B2 * 5/2007 Farnella et al. ......... 297/423.26
7,234,775 B2 * 6/2007 Serber .................... 297/301.1
7,243,935 B2 * 7/2007 Beumer .................. 280/250.1
7,306,290 B2 * 12/2007 Wiecek ................ 297/440.15
2001/0028188 A1 * 10/2001 Stumpf et al. ............... 297/320
2004/0174058 A1 * 9/2004 Meyer .................... 297/340
2004/0189076 A1 * 9/2004 Hanson et al. ......... 297/440.15
2005/0029855 A1 * 2/2005 Hanson et al. ......... 297/440.15
2005/0104429 A1 * 5/2005 Dobkin et al. ........... 297/301.4
2005/0264074 A1 * 12/2005 Holdampf ................ 297/344.1
2006/0273541 A1 * 12/2006 Norman et al. .......... 280/250.1
2007/0085396 A1 * 4/2007 Hunziker .................... 297/330
2007/0296178 A1 * 12/2007 Markwald .................. 280/287

FOREIGN PATENT DOCUMENTS

EP 0911008 B1 5/2002
GB 2085959 A * 5/1982
GB 2 171 898 A 9/1986
WO WO 9208636 5/1992
WO WO 9614232 5/1996

* cited by examiner

ADJUSTABLE MOTION WHEEL CHAIR

SPECIFICATION

This application claims the benefit of provisional application Ser. No. 60/699,429 filed Jul. 14, 2005.

BACKGROUND OF THE INVENTION

The present invention relates to an adjustable motion wheel chair which can be used in either a static mode with a back panel and seat panel in a fixed relation and can also be used in a dynamic mode where a user can stretch out to an extended position rather than a seated position while using the chair.

Wheel chairs are well known and wheel chairs allowing a user to stretch out to an extended position are also known. For example see U.S. Pat. No. 6,488,332 B1 to Markwald.

SUMMARY OF INVENTION

The present invention relates to an adjustable motion wheelchair which is completely adjustable to accommodate a user's size and degree of disability; to enable active movement; and to provide comfort. The wheel chair may be adjusted in a static position to allow for a selected angle between the back panel and the seat panel, pivotal at a point near the anatomic hip pivot. The wheel chair can be further adjusted to allow the seat and back of the wheel chair to be pivoted to a selected degree of tilt with the back panel and seat panel remaining in a constant angular position, around a point close to the center of gravity. Further, the wheel chair has a latch mechanism which when released allows the wheel chair to be used in a dynamic mode which allows the user to stretch out to an extended position and be able to return to the seated position. This allows a user of the wheel chair to extend and reinforce symmetrical movement patterns while in the wheel chair.

BRIEF DESCRIPTION OF DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
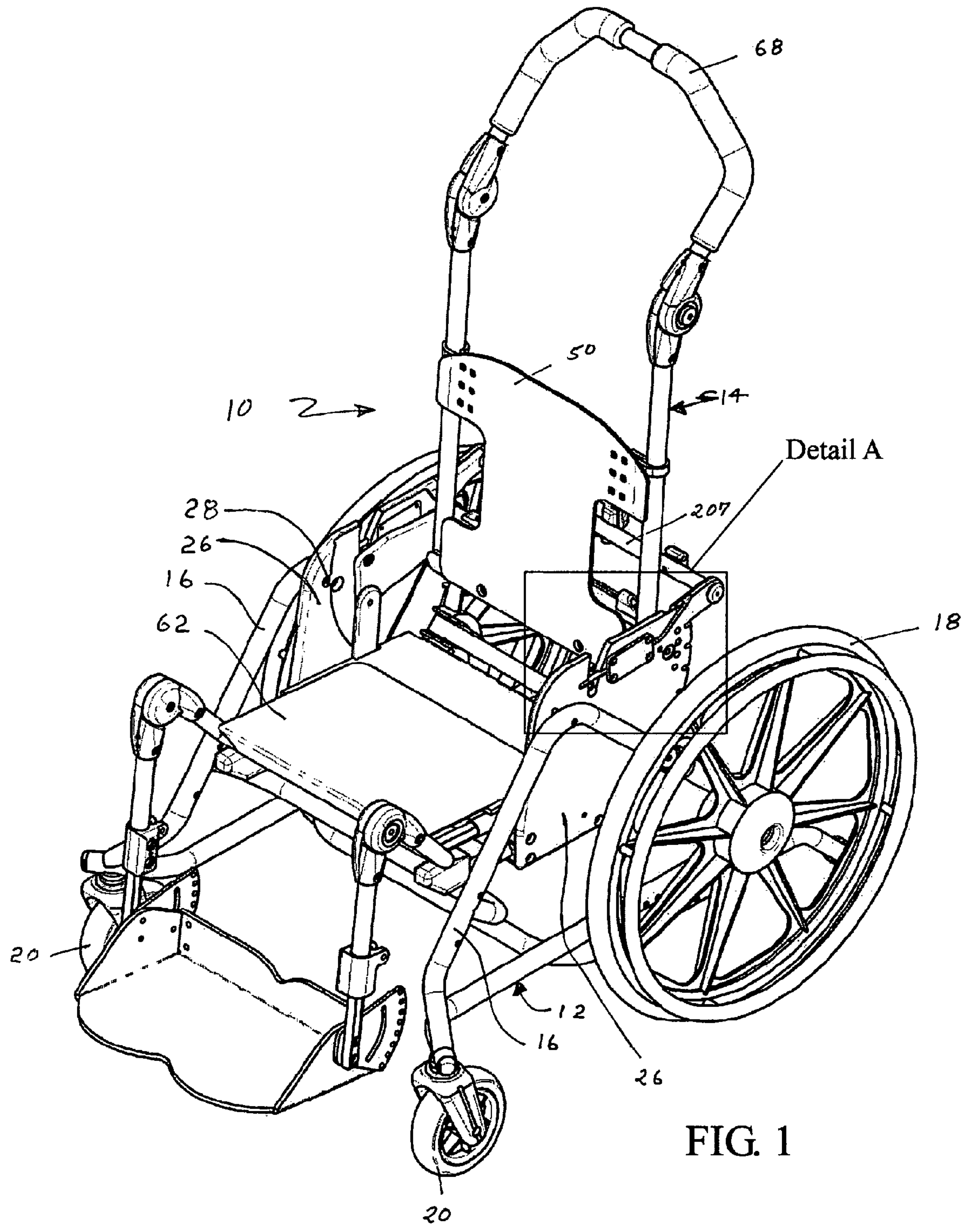
FIG. 1 is a front perspective view of the present invention; operable in a static mode.
Figure 2:
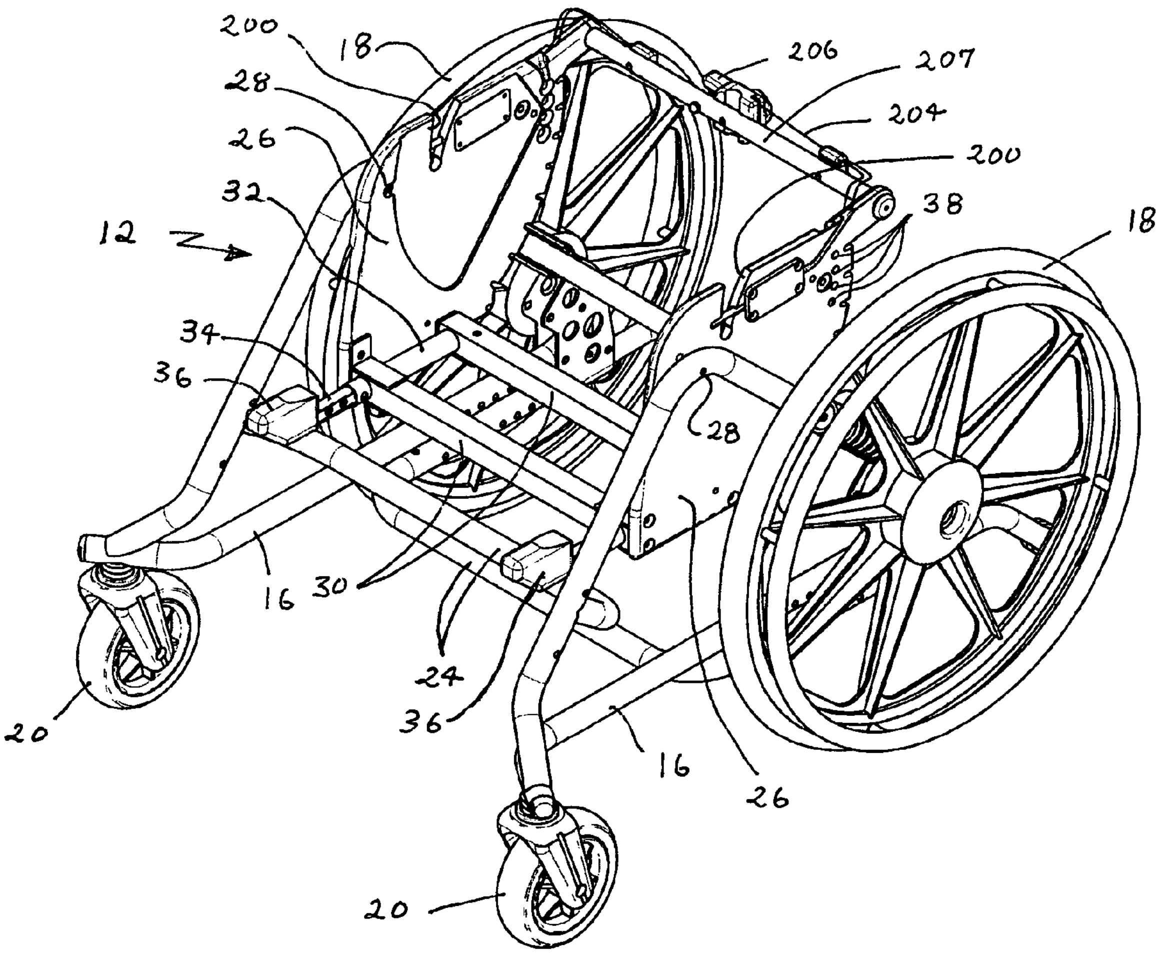
FIG. 2 is a front perspective view of a mobility base view with the present invention.
Figure 3:
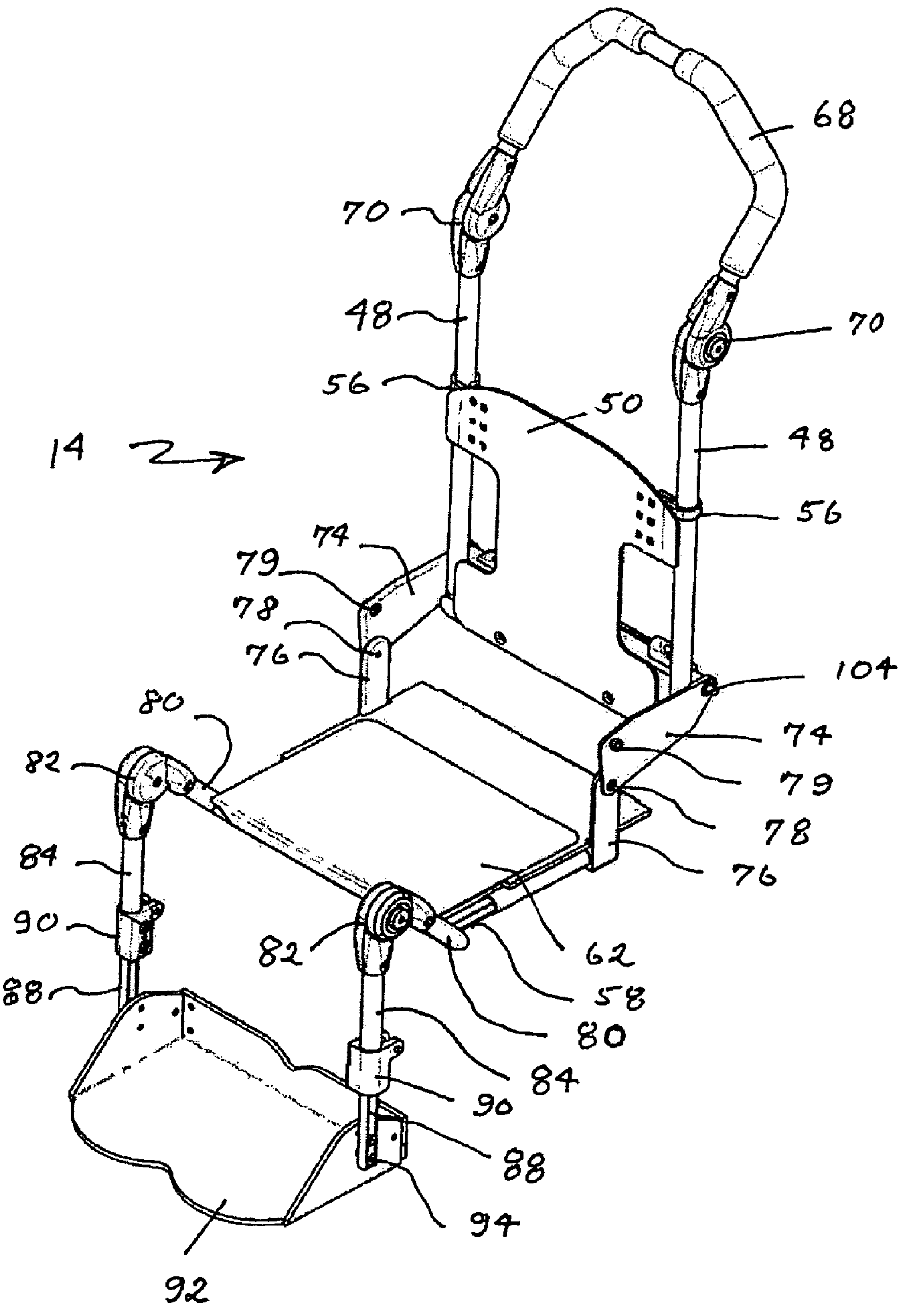
FIG. 3 is a front perspective view of a back panel, seat panel and foot rest used with the present invention.

An adjustable motion wheel chair 10 according to the present invention is shown in FIG. 1. The wheel chair 10 according to the present invention is constructed of two main components, namely, a base frame portion, referred to in the industry as a mobility base, 12 as shown in FIGS. 1 and 2 and a removable chair assembly 14 as shown in FIGS. 1 and 3. The mobility base 12 includes a pair of side frame members 16 supporting a pair of hand driven wheels 18 and also a pair of front idler wheels 20. At the rear of the mobility base 12 a pair of anti-tip stops (only one is shown) are used to prevent the mobility base 12 from tipping in the rearward direction. Cross bracing members 24 are provided to separate the two side frame members 16.

A pair of spaced apart and parallel arranged control plates 26 are pivotally mounted with pins 28 to a respective side frame 16 as shown in FIG. 2. Two cross bracing members 30 extend between the control plates 26 and are secured thereto as shown in FIG. 2. A pair of tubular sleeves 32 extend between and through the cross members 30 as shown in FIG. 2. The control plates 26 include a sector shaped portion having a series of spaced apart index holes 38. The peripheral edge is provided with a series of notches 40.

A rod 34 is slidably received by each of the tubular sleeves 32 and includes a limiting member 36 located at a distal end thereof. The rods 34 may be extended to a desired position and locked in place.

Figure 4:
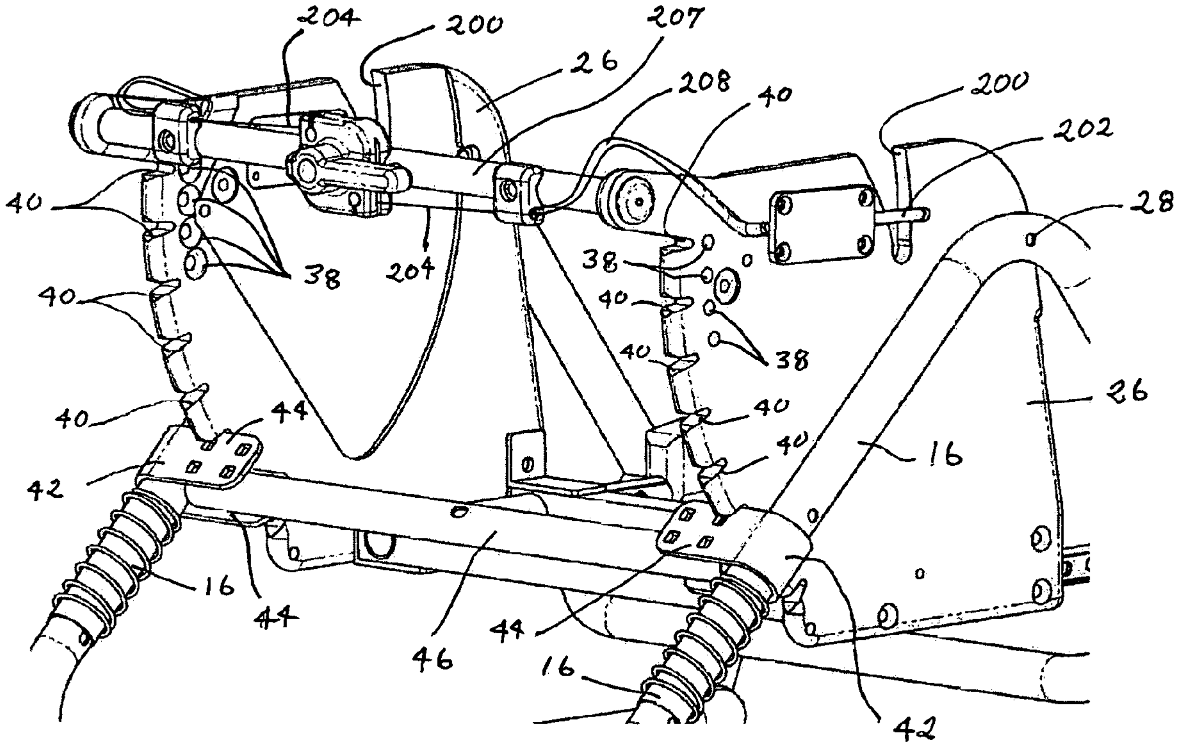
FIG. 4 is a front perspective detail view of control plates used with the present invention.
Figure 5:
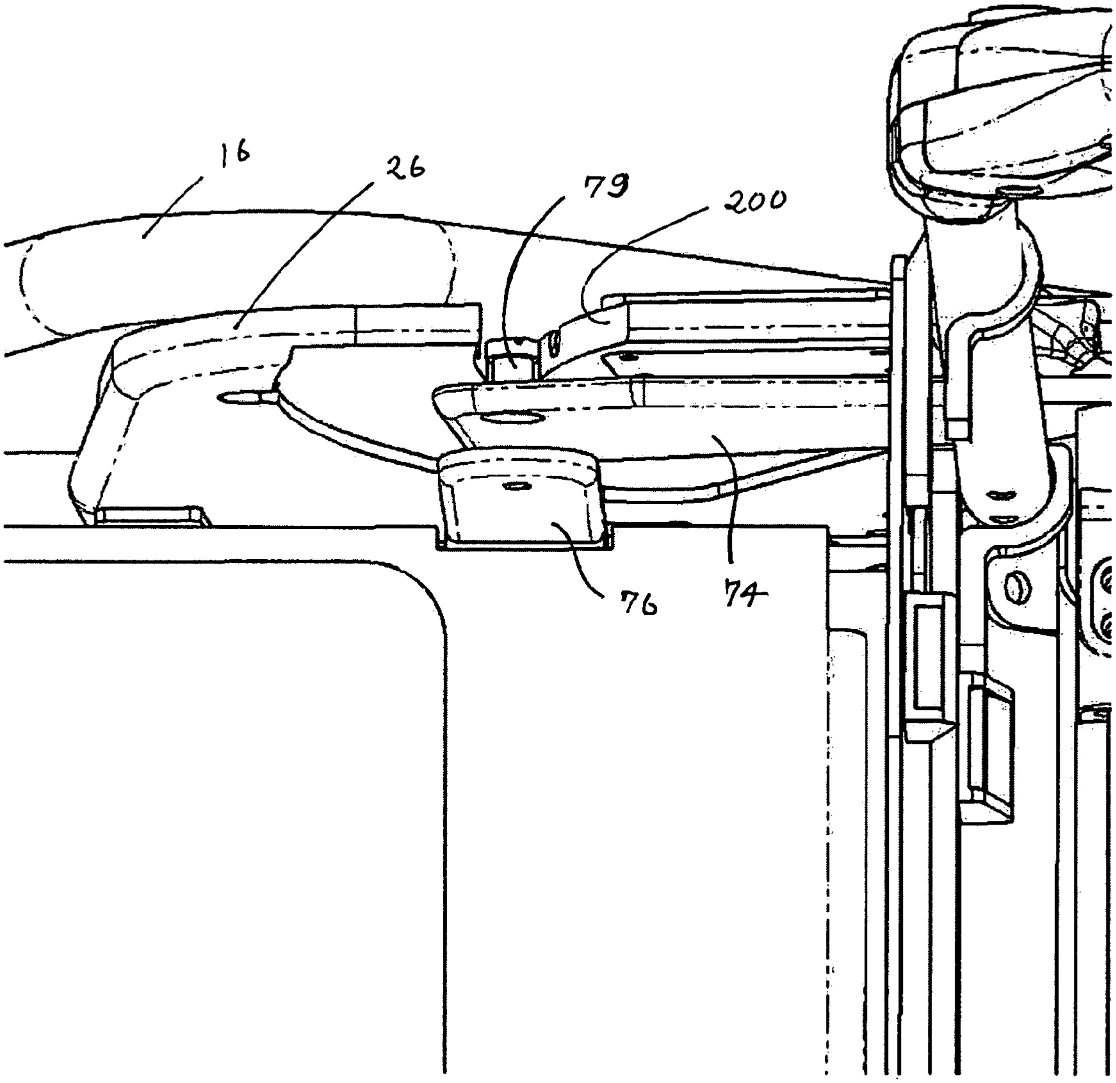
FIG. 5 is a top perspective detail view of a control plate used with the present invention.

A pair of catch members 42 are slidably mounted on the side frame members 16 as shown in FIGS. 2 and 4. Each catch member 42 includes a pair of parallel spaced apart plates 44 which have been spaced apart a distance to slide into notches 40 as shown in FIG. 5. The pair of catch members 42 are mounted to opposite distal ends of a pull rod 46. The pull rod 46 is spring biased toward the notches 40 but can be pulled outwardly causing the catch members 42 to slide away from the notches 40 to disengage the catch members 42 from the notches 40. After disengaging the catch members 42 from the notches 40 the control plate 26 can be rotated about pins 28. The rod 46 can then be released to enable the catch release 42 to engage selected notches 40 of the control plates 26.

Each control plate 26 is provided with a slot 200 as shown in FIGS. 2 and 4. A retractable rod 202 extends across the slot 200 as shown in FIG. 4. Each rod 202 is connected with a pull cable 204 to a twist handle 206 mounted on a cross bracing member 207. The cable 204 is threaded through a protective sheath 208 and a position guide. By twisting the handle 206, the pin 202 is retracted from the slot 200.

The chair assembly 14 is shown in FIG. 3. The chair assembly 14 includes a back frame 48 for supporting a back panel 50. The back panel 50 is secured to back frame 48 with a frictional lock 56. By loosening frictional lock 56 the panel 50 can be moved up or down on back frame 48. By tightening lock 56 the panel 50 is secured at a selected position.

A seat panel 62 of chair assembly 14 is supported by a seat frame 58 as shown in FIG. 3.

Figure 7:
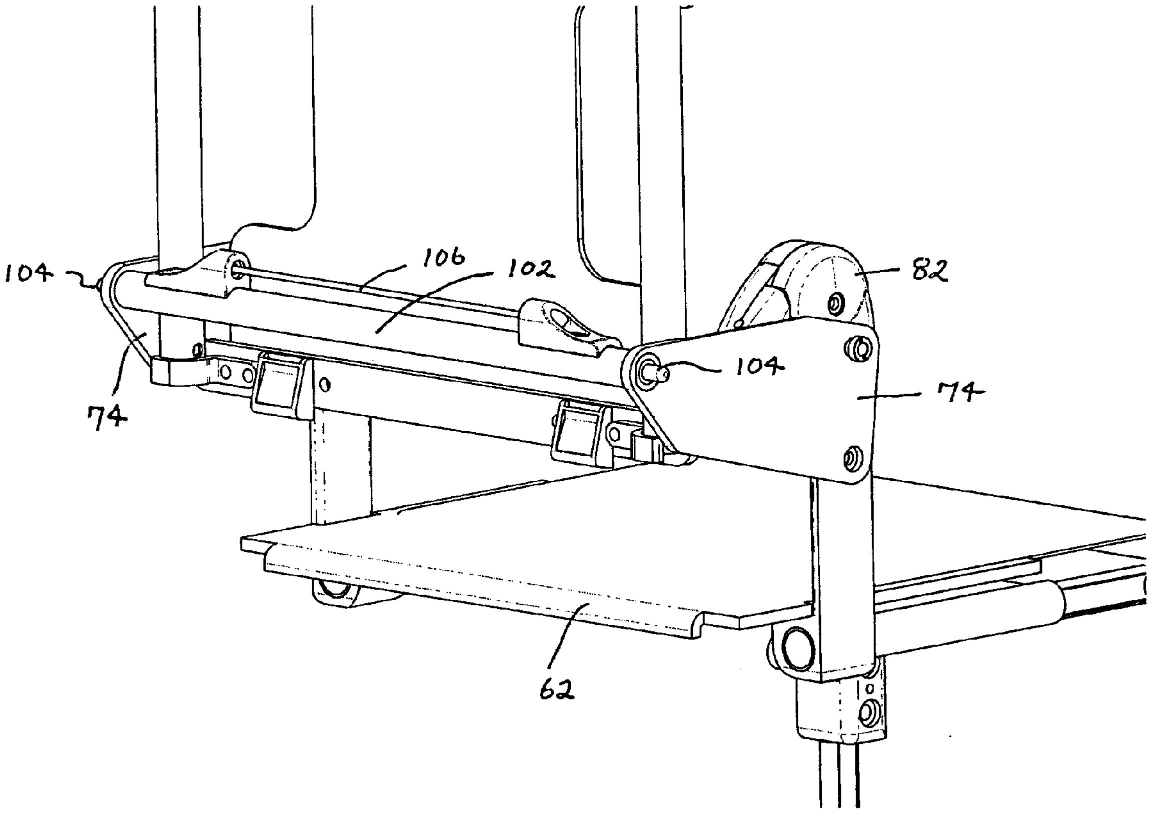
FIG. 7 is a perspective detail view of a positioning mechanism used with the present invention.

A push handle 68 is mounted to the frame 48 with hinge members 70 as shown in FIG. 7. The hinge member 70 allows a user to tilt the handle 68 with respect to the frame 48 by a selected amount and then allow the user to lock the handle at the selected position.

A pair of linkage members 74 are attached to the back frame 48 in an orthogonal relation as shown in FIG. 3. Similarly, a pair of seat linkage members 76 are attached in orthogonal relation with the seat frame members 58 also as shown in FIG. 9. Each of the linkage members 74 are pivotally joined to a respective seat linkage member 76 with a pin 78. An outwardly protruding pin 79 is secured to a respective linkage member 74 on opposite sides of the chair assembly 14. The pins 79 are sized to be received by the slot 200 provided in the control plate 26 shown in FIGS. 4 and 5.

A pair of extenders 80 are connected between the seat frame 58 and an adjustable elbow hinge 82 as shown in FIG. 3. The elbow hinge 82 is also connected to tubular leg extension members 84. In a preferred embodiment the elbow hinge 82 has a conventional mechanism to allow a user to lock extenders 80 and leg extension members 84 at a selected angular position.

A telescoping tube 88 is received by tubular leg extension member 84. The relative position between tubular leg extension 84 and the telescoping tube 88 is set by pins 90 which extend through leg extension member 84 and the telescoping tube 88 as shown in FIG. 3.

A foot rest 92 is pivotally connected to the telescoping tubes 88 with a pin 94.

Figure 6:
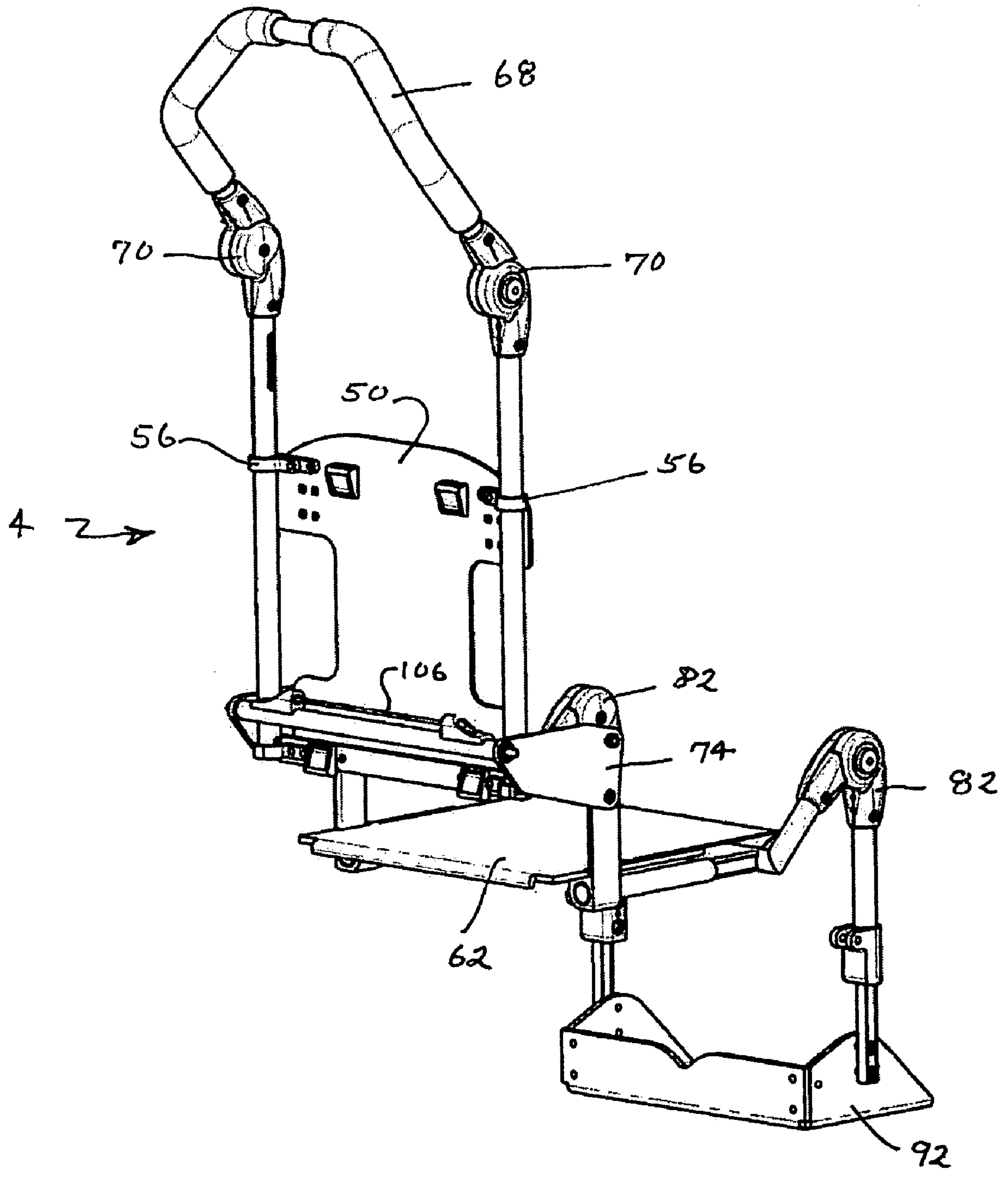
FIG. 6 is a rear perspective view of the back panel, seat panel and foot rest shown in FIG. 3.

A tubular member 102 is mounted between the back linkage members 74 as shown in FIGS. 6 and 7. A pair of pins 104 are held within the tube 102 and protrude outwardly under bias of a spring (not shown) within the tube 102. A cable pull 106 is used to retract the pins 104 against the bias of the spring when cable 106 is pulled. Once the cable pull 106 is released, the pins 104 are allowed to extend outwardly from tube 102. The pins 104 are sized to be slidably received by the holes 38 provided in the control plates 26 as shown in FIGS. 2 and 4.

Figure 1A:
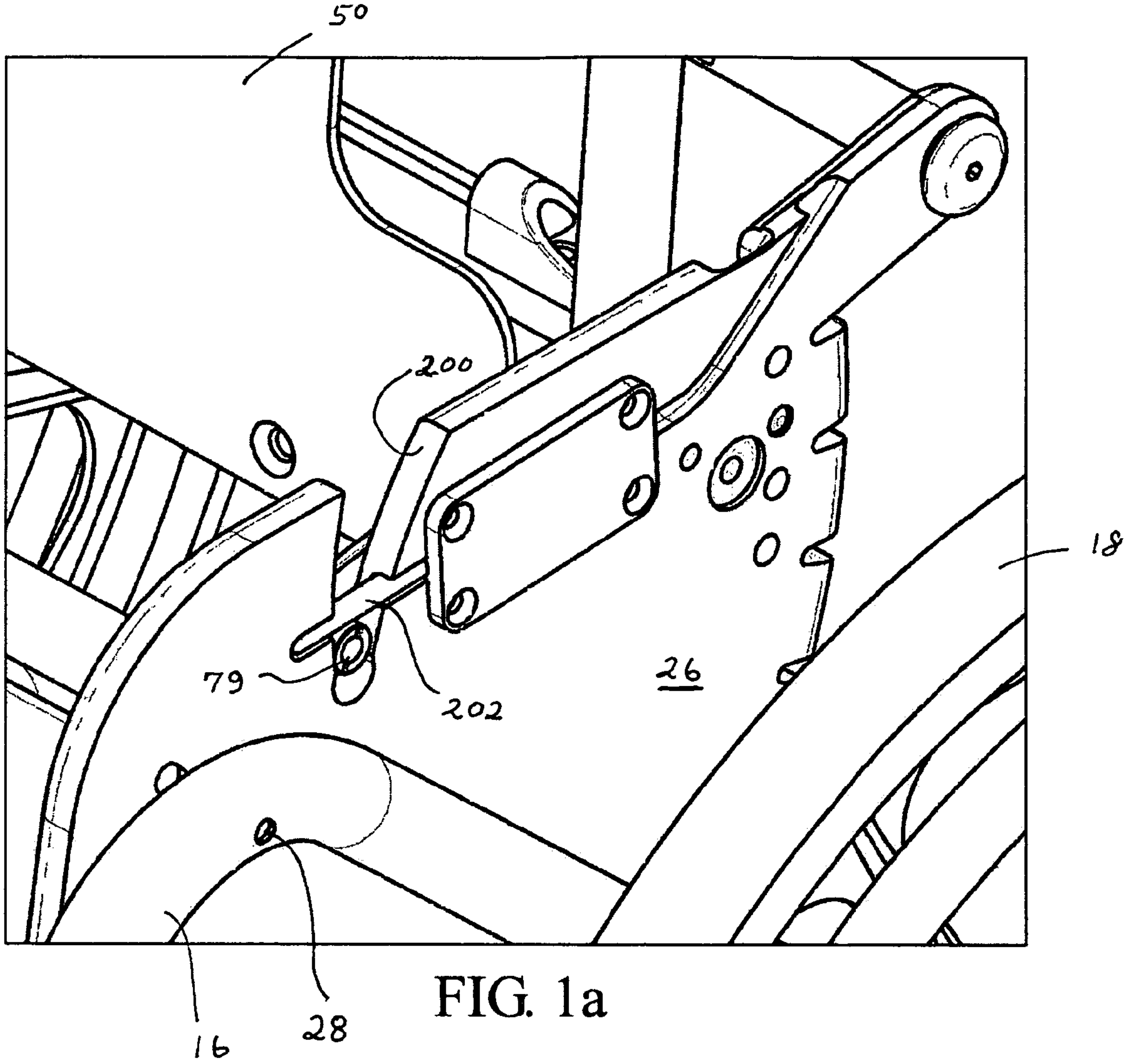
FIG. 1*a* is a detail A view shown in FIG. 1.

In using the present invention, the chair assembly 14 is placed over the mobility base 12 with pins 79 located within the slots 200 provided in the control plates 26 of the mobility base 12. The twist handle 206 is used to retract the rods 202 from slots 200 to allow the pins 79 to nest in the slots 200. The twist handle 206 is then released whereby the rods 202 lock the pins 79 within the slots 200 as shown in FIG. 1 and 1*a*.

The cable pull 106 is then pulled to retract the pins 104 within the tube 102 and the back panel 50 is rotated about pins 78 and 79 until a selected angular relationship between the back panel 50 and seat panel 62, known as the hip angle, is achieved. Once the angular position has been selected, the cable pull 106 is released causing the pins 104, under spring bias, to extend into a corresponding hole 38 provided in the control plate 26. Once the pins 104, are positioned in the selected holes 38, the angular position between the back panels and the seat panels is set for operation in the static mode.

Next the rod 46 may be pulled outwardly and the control plates 26 rotated on pins 28 thereby allowing the back panel and seat panel combination to be tilted to a selected position. The rod 46 is then released and the catch 42 engages a selected notch 40 at the desired tilt position.

The elbow hinges 82 can be adjusted to allow either free movement of the leg extension member 84 or the elbow hinges 82 can be locked to maintain a selected angular relation of the leg extension members 84 to the seat panels.

When the pins 202 are positioned to hold pins 79 in the notches 40, the wheel chair is latched in a static mode where the back panel and seat panel are locked in the set angular relation as shown in FIGS. 1 and 1*a*.

Figure 8:
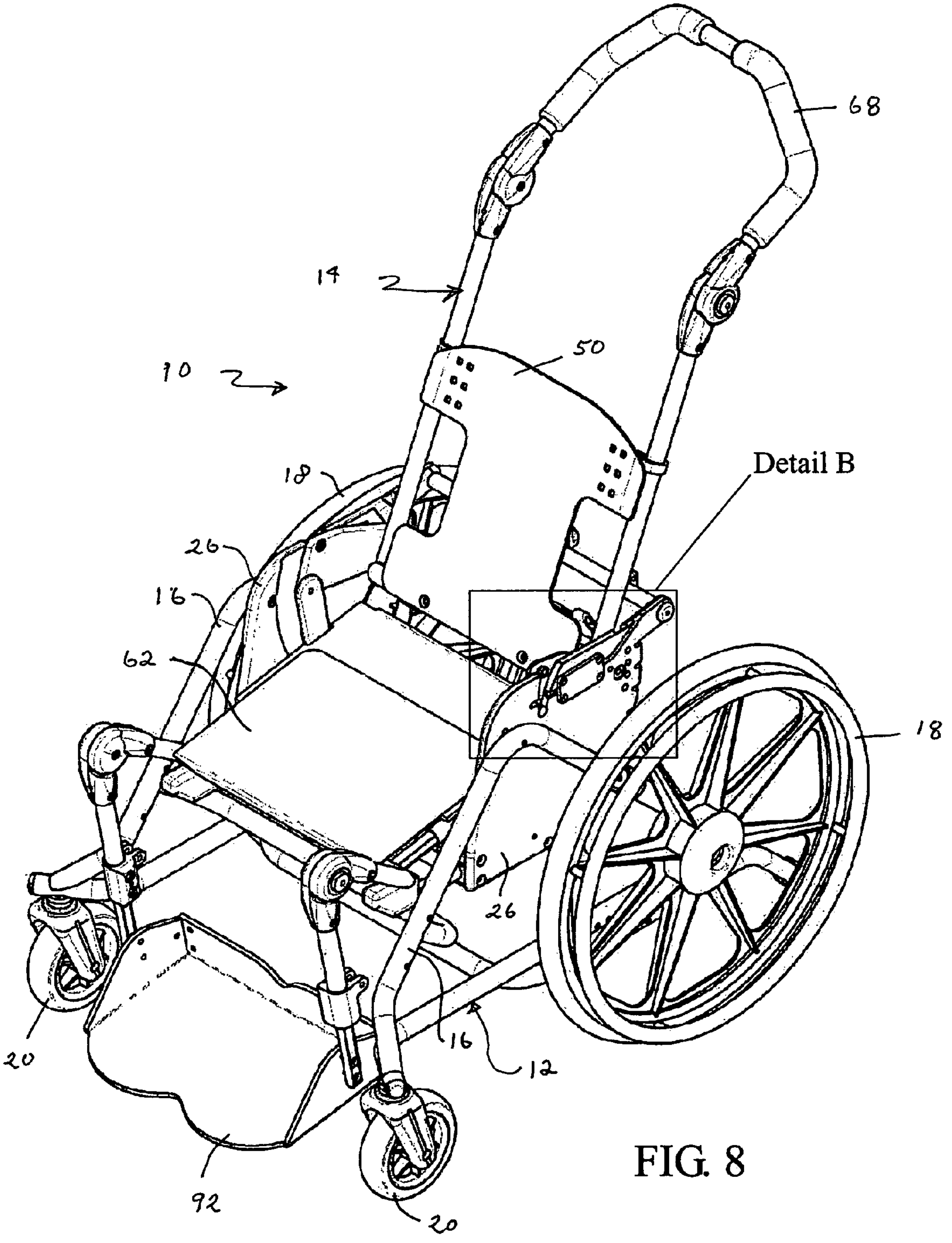
FIG. 8 is a front perspective view of the present invention operable in a dynamic mode.
Figure 8A:
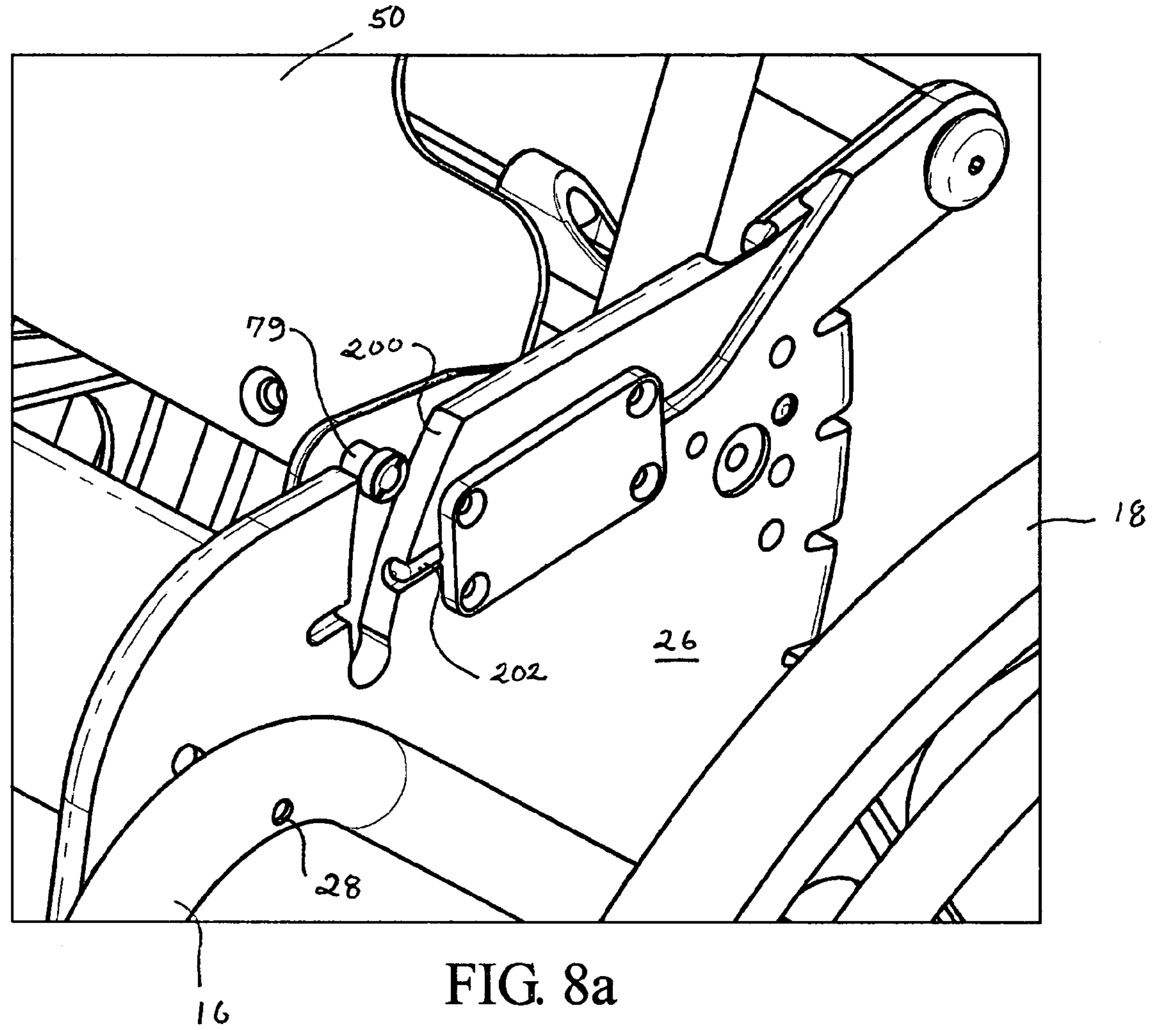
FIG. 8*a* is a detail B view shown in FIG. 8.

When the wheel chair assembly 10 is to be used in a dynamic mode the twist handle 206 is twisted to retract pins 202 and to allow the pins 79 to rise out of the notches 40. When this occurs the angular relation between the back panel and the seat panels of the wheel chair assembly 14 can be increased or decreased simply by the user leaning back on the back panel. The back panel pivots on the pins 104 positioned in the holes 38 of the control plates 26 and the seat panel pivots about the pins 78 connecting linkage members 74 and 76. The pins 79 freely rise in the slots 200 allowing a user to stretch out to an extended position. The front edge of the seat frame members 58 rest on the limiting members 36 provided in the mobility base 12 and the weight of the seat panel is supported by the engagement with the limiting members 36 and the pins 78. When the rods 34 holding the limiting members 36 are extended the pressure required to tilt the seat panel is increased and when the rods 34 are retracted the pressure required to tilt the seat panels is decreased. The chair 10 configured for use in the active mode is shown in FIGS. 8 and 8*a*.

The therapeutic wheel chair 10 according to the present invention provides a versatile wheel chair which can either be used in a static mode as a conventional wheel chair or can be used in a dynamic mode to allow a user to extend and reinforce symmetrical movement patterns using the wheel chair assembly as a support.

When the chair is not to be used, the cable pull 106 is used to disengage the pins 104 from the holes 38 of the control plate 26 and the back frame 48 may be rotated forwardly about the pins 78, connecting the linkage members 74 and 78, to a position where the back panels rest over the seat panels. In this way the unit may be collapsed to a space saving configuration.

It is understood that although the described embodiment relates to a wheel chair that other chairs could be used equally well.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

We claim:

1. An adjustable motion wheel chair comprising:

a chair assembly having a back frame pivotally attached to a seat frame via spaced apart back linkage members, each back linkage member forming a part of a lower end portion of the back frame, the seat frame having a pair of seat frame linkage members each forming a part of a rear portion of the seat frame, each seat frame linkage member being hingedly attached at a first pivot point on the seat frame linkage member to a corresponding one of the back frame linkage members; and a mobility base for supporting the chair assembly, the mobility base having a pair of spaced apart vertical control plates receiving the chair assembly positioned therebetween;

wherein the chair assembly pivotally attaches to the mobility base via a pair of pivot pins each extending from the lower end portion of the back frame into an adjacent one of the pair of control plates, permitting the back frame and seat frame to rotate in relation to each other via both rotation of the back frame rotating about the pivot pins in the pair of control plates and rotation of the hinged linkage between the seat frame and the back frame; and a pair of second pivot pins each releaseably engagable between one of the back frame linkage members and an adjacent one of the control plates, wherein the second pivot pins engaging the control plates are each spaced from the first pivot points on the seat frame linkage members.

2. The wheel chair assembly of claim 1 wherein when the second pivot pins are released from engagement in the control plates the rear portion of the seat frame is permitted to lift upward when the back frame is rotated away from the seat about the pivot pins on the lower end portion of the back frame.

3. The wheel chair assembly of claim 1 wherein when the second pivot pins are engaged in the control plates the back frame is prevented from rotation about the pivot pins on the lower end portion of the back frame.

4. The wheel chair assembly of claim 3 wherein when the pivot pins on the back frame are retracted from the control plates and the second pivot pins are engaged in the control plates, the back frame may be rotated about the second pivot pins in the control plates to fold the chair assembly for transport or to change the seat to back angle.

5. An adjustable motion wheel chair comprising:

a chair assembly having a back frame pivotally attached to a seat frame via spaced apart back linkage members, each back linkage member being fixedly attached to a lower end portion of the back frame, the seat frame having a pair of seat frame linkage members each fixedly attached to a rear portion of the seat frame, each seat frame linkage member being hingedly attached at a first pivot point on the seat frame linkage member to a corresponding one of the back frame linkage members; and a mobility base for supporting the chair assembly, the mobility base having a pair of side frame members supporting at least a pair of wheels, bracing members extending between the side frame members maintaining the side frame members in a spaced apart relation, and a pair of control plates each pivotally fastened to one of the side frame members of the mobility base so that the control plates may be rotated in parallel vertical planes, and spaced apart to receive the chair assembly positioned therebetween;

wherein the chair assembly pivotally attaches to the mobility base via a pair of pivot pins extending from the back frame into the pair of control plates fastened to the pair of side frame members of the mobility base, permitting the back frame and seat frame to rotate in relation to each other via both rotation of the back frame rotating about the pivot pins in the pair of control plates and rotation of the hinged linkage between the seat frame and the back frame.

6. The wheel chair according to claim 5 further comprising a pair of second pivot pins each engaged between the back frame linkage member and one of the control plates, wherein the second pivot pins are positioned spaced from the first pivot point on the seat frame linkage member.

7. The wheel chair according to claim 6 further comprising a latch mechanism attached to each of the control plates to releasably latch the second pivot pins to the control plates.

8. The wheel chair according to claim 6 wherein each second pivot pin is supported at the bottom of a slot in its one control plate.

9. The wheel chair according to claim 8 further comprising a latch mechanism attached to each control plate for releasably retaining the second pivot pins engaged in the control plates.

10. The wheel chair according to claim 9 wherein the second pivot pins are releasably engaged in the control plates in a first position so that the back frame may be rotated about the second pivot pins when the back frame pivot pins are retracted from the control plates.

11. The wheel chair according to claim 10 wherein the second pivot pins are freed from engagement in the control plates in a second position permitting the seat frame to rotate about the first pivot point on the linkage members when the back frame is rotated about the control plate.

12. The wheel chair according to claim 5 further comprising a latch mechanism attached to each control plate for releasably retaining the second pivot pins engaged in the control plates.

13. The wheel chair according to claim 5 wherein the second pivot pins are releasably engaged in the control plates in a first position so that the back frame may be rotated about the second pivot pins when the back frame pivot pins are retracted from the control plates.

14. The wheel chair according to claim 13 wherein the second pivot pins are freed from engagement in the control plates in a second position permitting the seat frame to rotate about the first pivot point on the linkage members when the back frame is rotated about the control plate.

15. The wheel chair according to claim 5 further comprising a seat attached to the seat frame.

16. The wheel chair according to claim 5 wherein a front end of the seat frame is attached to a foot support structure.

17. An adjustable motion wheel chair comprising:

a chair assembly having a back frame pivotally attached to a seat frame via spaced apart back linkage members, each back linkage member being fixedly attached to a lower end portion of the back frame, the seat frame having a pair of seat frame linkage members each fixedly attached to a rear portion of the seat frame, each seat frame linkage member being hingedly attached at a first pivot point on the seat frame linkage member to a corresponding one of the back frame linkage members; and a mobility base for supporting the chair assembly, the mobility base having a pair of side frame members supporting at least a pair of wheels, bracing members extending between the side frame members maintaining the side frame members in a spaced apart relation, and a pair of control plates each pivotally fastened to one of the side frame members of the mobility base so that the control plates may be rotated in parallel vertical planes, and spaced apart to receive the chair assembly positioned therebetween;

wherein the chair assembly pivotally attaches to the mobility base via a pair of pivot pins extending from the back frame into the pair of control plates fastened to the pair of side frame members of the mobility base, permitting the back frame and seat frame to rotate in relation to each other via both rotation of the back frame rotating about the pivot pins in the pair of control plates and rotation of the hinged linkage between the seat frame and the back frame; and a pair of second pivot pins each releaseably engaged between the back frame linkage member and one of the control plates, wherein the second pivot pins are each positioned spaced from the first pivot point on the seat frame linkage member and when released from engagement in the control plates permit the seat frame to rotate about the first pivot point on the linkage members in a direction opposite to that of the back frame rotating about the control plate.

18. The wheel chair according to claim 17 further comprising a latch mechanism attached to each of the control plates to releasably latch the second pivot pins to the control plates.

19. The wheelchair according to claim 17 wherein the second pivot pins are each carried in an elongated slot in one of the control plates.

20. The wheel chair according to claim 19 further comprising a latch mechanism attached to each of the control plates to releasably latch the second pivot pin at the bottom of the slot to the control plate.

21. The wheel chair according to claim 20 further comprising a second latch mechanism attached to the mobility base for retaining the control plates in one of a plurality of rotational positions.

22. The wheel chair according to claim 17 further comprising a foot rest assembly attached to the seat frame.

* * * * *

UNITED STATES PATENT AND TRADEMARK OFFICE

CERTIFICATE OF CORRECTION

PATENT NO. : 7,455,362 B2
APPLICATION NO. : 11/486407
DATED : November 25, 2008
INVENTOR(S) : Wayne H. Hanson et al.

It is certified that error appears in the above-identified patent and that said Letters Patent is hereby corrected as shown below:

Column 6
Lines 1 and 5, delete "5" and insert -- 6 -- therefore.

Signed and Sealed this

Third Day of February, 2009

JOHN DOLL
*Acting Director of the United States Patent and Trademark Office*